US012567953B2

(12) United States Patent
Menon et al.

(10) Patent No.: US 12,567,953 B2
(45) Date of Patent: *Mar. 3, 2026

(54) INLINE SECURITY KEY EXCHANGE

(71) Applicant: Juniper Networks, Inc., Sunnyvale, CA (US)

(72) Inventors: Abilash Menon, Boxborough, MA (US); Avinash Prakash Bhat, Bedford, MA (US); Anna Yungelson, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/745,443

(22) Filed: Jun. 17, 2024

(65) Prior Publication Data

US 2024/0340163 A1 Oct. 10, 2024

Related U.S. Application Data

(63) Continuation of application No. 17/651,599, filed on Feb. 18, 2022, now Pat. No. 12,041,162.

(60) Provisional application No. 63/263,066, filed on Oct. 26, 2021.

(51) Int. Cl.
*H04L 9/08* (2006.01)
*H04L 9/40* (2022.01)

(52) U.S. Cl.
CPC .......... *H04L 9/0825* (2013.01); *H04L 9/0827* (2013.01); *H04L 9/0891* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 9,729,439 | B2 | 8/2017 | MeLampy et al. |
| 10,826,876 | B1 | 11/2020 | Sinn et al. |
| 2003/0031320 | A1 | 2/2003 | Fan et al. |
| 2003/0200176 | A1 | 10/2003 | Foster et al. |
| 2014/0044262 | A1 | 2/2014 | Loprieno et al. |

(Continued)

FOREIGN PATENT DOCUMENTS

| | | |
|---|---|---|
| WO | 2017083980 A1 | 5/2017 |
| WO | 2021032304 A1 | 2/2021 |

OTHER PUBLICATIONS

"Transmission Control Protocol," DARPA Internet Program, RFC 793, Sep. 1981, 91 pp.

(Continued)

*Primary Examiner* — Michael Pyzocha

(74) *Attorney, Agent, or Firm* — Shumaker & Sieffert, P.A.

(57) ABSTRACT

Techniques are disclosed for inline security key exchanges between network devices. An example network device includes one or more processors and memory coupled to the one or more processors. The memory stores instructions that, upon execution, cause one or more processors to obtain a first payload key and obtain a path key. The instructions cause the one or more processors to encrypt a first payload of a first packet using the first payload key and insert the first payload key into first metadata of the first packet. The instructions cause the one or more processors to encrypt the first metadata using the path key and send the first packet to another network device.

19 Claims, 4 Drawing Sheets

(56) References Cited

U.S. PATENT DOCUMENTS

| | | |
|---|---|---|
| 2015/0058629 A1 | 2/2015 | Yarvis et al. |
| 2016/0205133 A1 | 7/2016 | Mackey et al. |
| 2016/0315762 A1 | 10/2016 | Moon et al. |
| 2017/0033924 A1 | 2/2017 | Jain et al. |
| 2018/0278419 A1* | 9/2018 | Higgins ............... G06F 16/951 |
| 2019/0140826 A1 | 5/2019 | Carrel et al. |
| 2020/0304477 A1 | 9/2020 | Venkataraman |
| 2023/0078461 A1 | 3/2023 | Tanaka et al. |
| 2023/0131877 A1 | 4/2023 | Menon et al. |

OTHER PUBLICATIONS

Extended Search Report from counterpart European Application No. 22172852.0 dated Oct. 27, 2022, 9 pp.

Menezes et al., "Chapter 13: Key Management Techniques", Handbook of Applied Cryptography, Oct. 1996, pp. 543-590., Retrieved from the Internet on Oct. 12, 2022 from URL: http://www.cacr.math.uwaterloo.ca/hac/.

Notice of Intent to Grant and Text Intended to Grant from counterpart European Application No. 22172852.0 dated May 10, 2024, 46 pp.

Prosecution History from U.S. Appl. No. 17/651,599, dated Dec. 28, 2023 through Mar. 15, 2024, 30 pp.

Response to Extended Search Report dated Oct. 27, 2022, from counterpart European Application No. 22172852.0 filed Nov. 1, 2023, 27 pp.

* cited by examiner

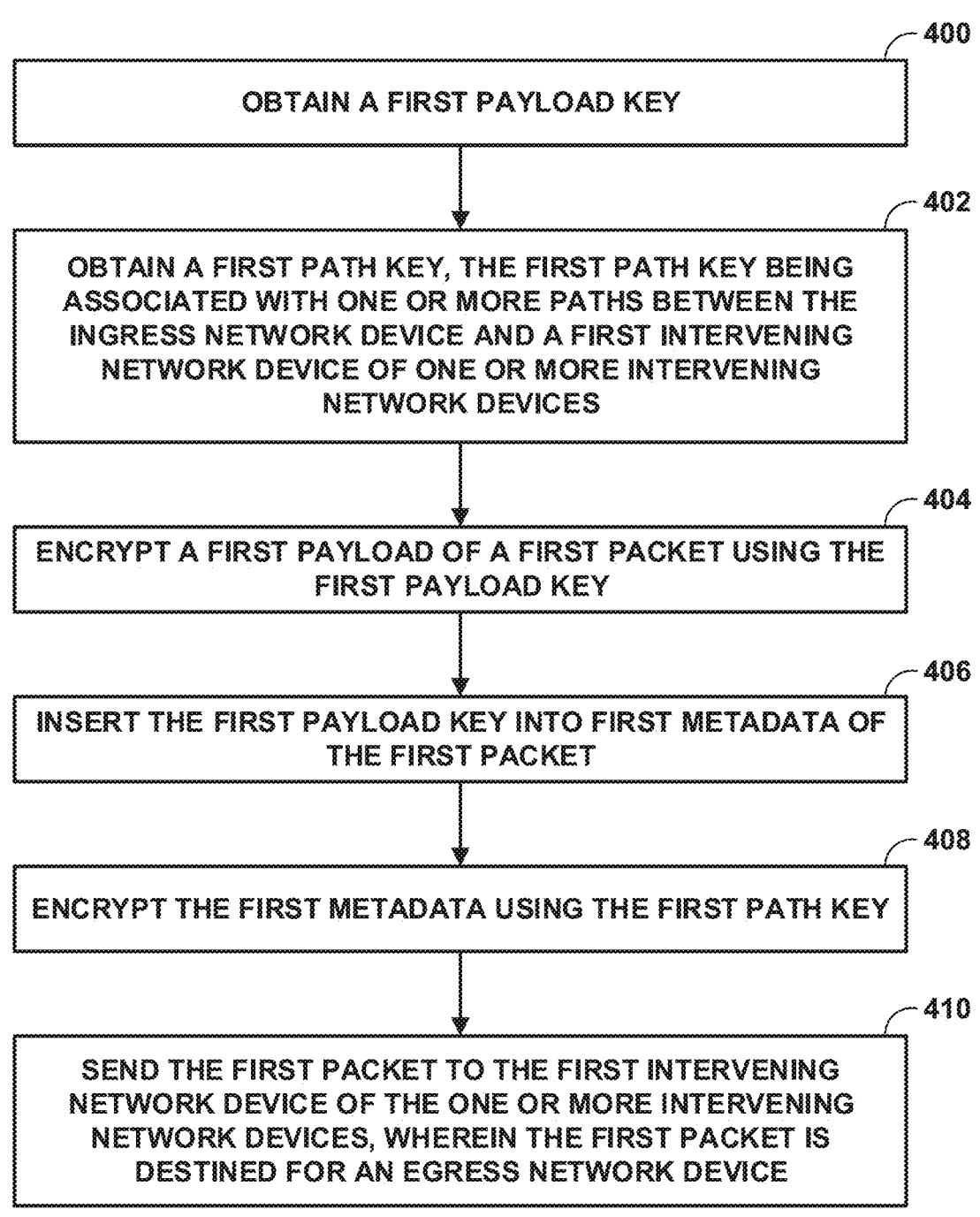

400

OBTAIN A FIRST PAYLOAD KEY

402

OBTAIN A FIRST PATH KEY, THE FIRST PATH KEY BEING ASSOCIATED WITH ONE OR MORE PATHS BETWEEN THE INGRESS NETWORK DEVICE AND A FIRST INTERVENING NETWORK DEVICE OF ONE OR MORE INTERVENING NETWORK DEVICES

404

ENCRYPT A FIRST PAYLOAD OF A FIRST PACKET USING THE FIRST PAYLOAD KEY

406

INSERT THE FIRST PAYLOAD KEY INTO FIRST METADATA OF THE FIRST PACKET

408

ENCRYPT THE FIRST METADATA USING THE FIRST PATH KEY

410

SEND THE FIRST PACKET TO THE FIRST INTERVENING NETWORK DEVICE OF THE ONE OR MORE INTERVENING NETWORK DEVICES, WHEREIN THE FIRST PACKET IS DESTINED FOR AN EGRESS NETWORK DEVICE

FIG. 4

INLINE SECURITY KEY EXCHANGE

This application is a continuation of U.S. patent application Ser. No. 17/651,599, filed 18 Feb. 2022, which claims the benefit of U.S. Provisional Patent Application No. 63/263,066, filed 26 Oct. 2021, the entire content of each application is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow.

Alternatively, a session may be unidirectional in that the session includes packets traveling in only one direction from a first device to a second device. For example, a session includes a forward packet flow originating from a first device and destinated for a second device. A different session may include a reverse packet flow originating from the second device and destined for the first device.

To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In a traditional network system, a centralized security server may be used to distribute and update keys used by network devices to encrypt and decrypt network traffic. Such a server may attempt to update a key by providing a new key to each network device. However, if a network device is unavailable during an update, that network device would not have the proper key to decrypt traffic from other network devices as the other network devices may be using the updated key. Additionally, the other network devices may not be able to decrypt traffic from the network device that was unavailable, as the network device that was unavailable may be using an outdated key.

In some traditional network systems, the centralized security server may not have direct connections to each network device. In such cases, a network device may have to insert the key into the payload of a packet. That packet may traverse the network, being decrypted and re-encrypted at each intervening router between the ingress router and egress router. Such an arrangement may involve a large amount of processing power due to all the encrypting and decrypting that is required.

In general, this disclosure describes techniques for providing a key inline without the need for a centralized security server. In one example, each path in a network between two network devices is associated with a path key which is used to encrypt and decrypt metadata associated with packets flowing between the two network devices. A first network device encrypts the payload of a packet using a payload key, which may be different than the path keys. The first network device may insert the payload key into metadata associated with the packet. The network device then encrypts the metadata using the path key. One or more intervening network devices each using their associated path keys may decrypt the metadata, determine that the packet is not destined for a client device coupled to the one or more intervening network devices based on the metadata, and re-encrypt the metadata using the path key associated with a path to the next network device. When the packet arrives at the network device that is coupled to the client device for which the packet is destined (the terminus or egress network device), the egress network device may decrypt the metadata using the path key associated with the path between the egress network device and the upstream next hop network device that sent the packet to the egress network device. The egress network device may determine that the packet is intended for the client device coupled to the egress network device based on the metadata. The egress network device may then obtain the payload key from the decrypted metadata and use the payload key to decrypt the payload of the packet. In some examples, one or more of the network devices may be session-based routers and the payload key may be associated with a session.

The techniques of the disclosure may provide specific improvements to the computer-related field of computer networking that have practical applications. For example, the techniques disclosed herein may provide for the distribution of payload keys in a point-to-point manner that does not require a centralized security server and which does not require each intervening network device to decrypt the payload of a packet and re-encrypt the payload, saving considerable processing power and network resources, particularly in the case where there are numerous intervening network devices.

In one example, this disclosure describes a network device including one or more processors and memory coupled to the one or more processors, the memory storing instructions that, upon execution, cause one or more processors to: obtain a first payload key; obtain a path key; encrypt a first payload of a first packet using the first payload key; insert the first payload key into first metadata of the first packet; encrypt the first metadata using the path key; and send the first packet to another network device.

In another example, this disclosure describes a network device including one or more processors and memory coupled to the one or more processors, the memory storing instructions that upon execution cause one or more processors to: obtain a path key; receive a first packet from another network device; decrypt first metadata of the first packet using the path key; obtain a first payload key from the first metadata of the first packet; and decrypt a first payload of the first packet using the first payload key.

In another example, this disclosure describes a method including: obtaining, by one or more processors of an ingress network device, a first payload key; obtaining, by one or more processors of the ingress network device, a first path key, the first path key being associated with one or more paths between the ingress network device and a first intervening network device of one or more intervening network devices; encrypting, by one or more processors of the ingress network device, a first payload of a first packet using the first payload key; inserting, by the one or more processors of the ingress network device, the first payload key into first metadata of the first packet; encrypting, by the one or more processors of the ingress network device, the first metadata using the first path key; and sending, by the one or more processors of the ingress network device, the first packet to the first intervening network device of the one or more intervening network devices, wherein the first packet is destined for an egress network device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRA WINGS

FIG. 4 is a flowchart illustrating an example operation in accordance with the techniques of the disclosure.

Like reference characters refer to like elements throughout the figures and description.

DETAILED DESCRIPTION

Figure 1:
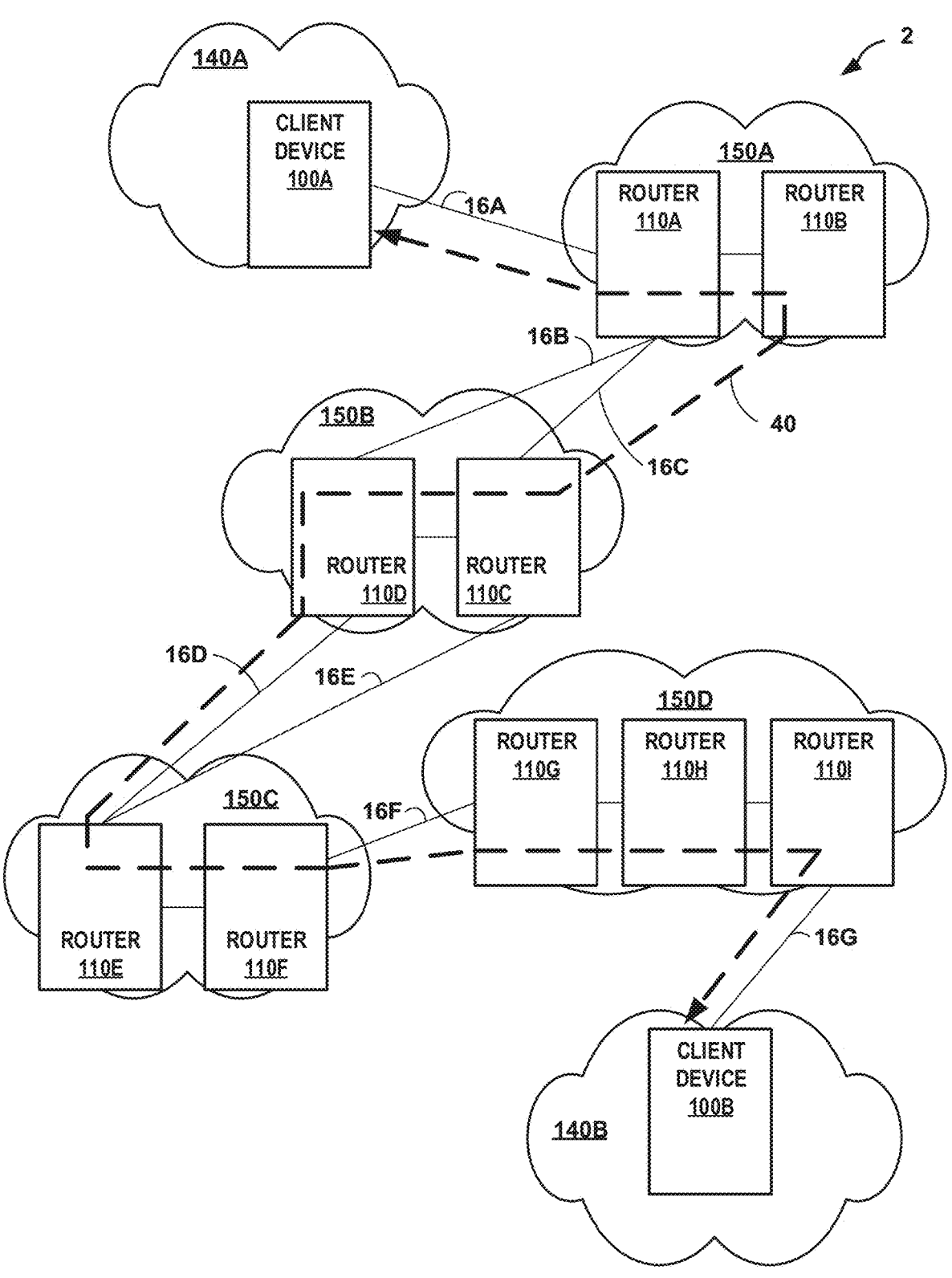
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes service provider networks 150A-150D (collectively, "service provider networks 150") configured to provide Wide Area Network (WAN) connectivity to disparate customer networks 140A-140B (collectively, "customer networks 140"). Routers 110A-110I (collectively, "routers 110") of service provider networks 150 provide client devices 100A-100B (collectively, "client devices 100") associated with customer networks 140 with access to service provider networks 150. In some examples, customer networks 140 are enterprise networks. Customer network 140A is depicted as having a single client device 100A and customer network 140B is depicted as having a single client device 100B for case of illustration, but each of customer networks 140 may include any number of client devices.

In some examples, customer networks 140 may be L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices 100, each of which may communicate across service provider networks 150 with one another as described in more detail below. Communication links 16A-16G (collectively, links "16") may be Ethernet, ATM or any other suitable network connections. In other examples, customer networks 140 may be L3 networks. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional routers are not shown for case of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, routers 110 may implement a stateful, session-based routing scheme that enables each of routers 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc. In some examples, routers 110 include Ethernet over SVR (EoSVR) routers.

In the example of FIG. 1, client device 100A of system 2 establishes session 40 (shown with a dashed line) with client device 100B. Routers 110 facilitate establishment of session 40 by transporting network traffic between client device 100A and client device 100B. In some examples, client device 100A may be considered a "source" device in that client device 100A originates session 40 between client device 100A and client device 100B, e.g., client device 100A is the "source" of a packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, routers 110A-110I, and client device 100B.

In some examples, routers 110 may extend session 40 as an L3 session across service provider networks 150 according to one or more L3 communication session protocols, including Transmission Control Protocol (TCP) or User Datagram Protocol (UDP), etc. For example, to establish session 40 according to TCP such that data may be exchanged according to TCP, client device 100A and client device 100B perform a three-way handshake. Client device 100A sends a first packet comprising a "SYN" flag to client device 100B. Client device 100B acknowledges receipt of the first packet by responding to client device 100A with a second packet comprising a "SYN-ACK" flag. Client device 100A acknowledges receipt of the second packet by responding to client device 100B with a third packet comprising an "ACK" flag. After sending the third packet, session 40 is established according to TCP and client devices 100A, 100B may exchange data with one another via session 40. Additional example information regarding TCP is described in "TRANSMISSION CONTROL PROTOCOL,"

Request for Comments (RFC) 793, Internet Engineering Task Force (IETF), September 1981, available at https://tools.ietf.org/html/rfc793, the entire contents of which are incorporated herein by reference.

UDP is a connectionless protocol in that client device 100A does not verify that client device 100B is capable of receiving data prior to transmitting data. To establish session 40 according to UDP, client device 100A transmits a first packet to client device 100B. Session 40 may be considered "established" according to UDP upon receipt by client device 100A of any packet from client device 100B, which implies that client device 100B successfully received the first packet from client device 100A, responded, and client device 100A was able to receive the response from client device 100B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for the forward packet flow originating from client device 100A and destined for client device 100B, router 110A determines whether the packet belongs to a new session (e.g., is the "first" packet or "lead" packet of session 40). In some examples, router 110A determines whether a source address, source port, destination address, destination port, and protocol of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 100B, and a protocol used by the first packet. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion of the path between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI).

In the example of FIG. 1, a stateful routing session may be established from router 110A (which may be an ingress router) through intervening network devices, such as routers 110B 110H, to router 110I (which may be an egress router). In this example, router 110A determines that the first packet is an unmodified packet and the first packet of new session 40. Router 110A modifies the first packet to include metadata specifying the session identifier. The metadata may, in some examples, be inserted after the header of the modified first packet. The session identifier may include, e.g., the original source address, source port, destination address, destination port, protocol, service, and/or tenant. Router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 100B. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 100B. In this fashion, router 110A may perform service-specific path selection to select a network path that best suits the requirements of the service. In contrast to a network topology that uses an SDN controller to perform path selection, each of routers 110 performs path selection. Further, the use of session-based routing enables each of routers 110 to make routing decisions at the service- or application-level, in contrast to conventional routers that are only able to make routing decisions at the flow level.

According to the techniques of this disclosure, network devices, such as routers 110, may provide inline payload key exchange. For example, router 110A may obtain a first payload key and obtain a path key. For example, this first payload key may be generated by router 110A or may be received by router 110A from, for example, a security server (not shown). In some examples, the first payload key is specific to a session. In some examples, the first payload key may be based on a service. For example, a voice service may have one associated payload key, while a video service may have another associated payload key.

In some examples, router 110A and router 110B may exchange path keys using transport layer security (TLS). In some examples, the same path key is used for all peer-to-peer paths between router 110A and router 110B. In response to obtaining the first payload key and path key, router 110A may insert the payload key into metadata associated with a packet. Router 110A may then encrypt the metadata and/or the packet header, using a path key that router 110A shares with router 110B.

Router 110A may forward the modified first packet to router 110B. Additionally, router 110A may store the session identifier for session 40 such that, upon receiving subsequent packets for session 40, router 110A may identify the subsequent packets as belonging to the same session 40 and forward the subsequent packets along the same path as the first packet.

Intervening router 110B may receive the modified first packet and decrypt the metadata using the path key shared between router 110A and router 110B. Router 110B then may determine whether the modified first packet includes metadata specifying the session identifier. In response to determining that the modified first packet includes metadata specifying the session identifier, intervening router 110B may determine that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B may determine that the packet belongs to a new session and create an entry in the session table. Furthermore, if the packet belongs to a new session, router 110B may generate a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router of routers 110 as each of routers 110 forwards the first packet along the forward path. Furthermore, each of routers 110 may store this header information to identify a previous router of routers 110 (or "waypoint") and a next router of routers 110 (or "waypoint") such that each of routers 110 may reconstruct the same forward path and reverse path for each subsequent packet of the session.

Router 110B may replace the header of the modified first packet to specify a source address that is an address of router 110B, a source port that is a port via which router 110B forwards the modified first packet toward client device 100B, a destination address that is an address of the next hop to which router 110B may forward the first packet (e.g., an address of router 110C for session 40 along the first path), and a destination port that is a port of the next hop to which router 110B may forward the first packet (e.g., a port of router 110C). Router 110B may encrypt the metadata, including the payload key, using a path key router 110B shares with router 110C and forward the modified first packet to router 110C. Additionally, router 110B may store the session identifier for the session such that, upon receiving subsequent packets for the session, router 110B may identify subsequent packets as belonging to the same session and forward the subsequent packets along the same path as the first packet.

Subsequent intervening network devices, such as routers 110C-110H, may process the modified first packet in a similar fashion as routers 110A and 110B such that routers 110 forward the subsequent packets of the session along the same path as the first packet. Further, each of routers 110 may store a session identifier for the session, which may include an identification of the previous router of routers 110 along the network path. Thus, each of routers 110 may use the session identifier to forward packets of the reverse packet flow for the session along the same network path back to client device 100A. As the packet is not destined for any client device coupled to any of the intervening network devices (e.g., routers 110B-110H), none of the intervening network devices need to decrypt the payload using the payload key. Therefore, each of the intervening network devices (e.g., routers 110B-110H) may refrain from decrypting the payload, thus saving network processing resources.

A router of routers 110 that may forward packets for a forward packet flow of the session to a destination for the packet flow may be called an egress, or "terminus" router. In the foregoing example, router 110I is a terminus router because router 110I may forward packets to client device 100B. Router 110I receives the modified first packet that comprises the metadata specifying the session identifier (e.g., the original source address, source port, destination address, and destination port) and the metadata including the payload key. Router 110I decrypts the metadata using a path key router 110I shares with router 110H, identifies the modified first packet as destined for a service terminating at router 110I by determining that the destination source address and destination source port specified in the metadata of the modified lead packet corresponds to a destination reachable by router 110I (e.g., client device 100B). Router 110I recovers the original first packet by removing the metadata from the modified first packet, decrypting the payload using the payload key from the metadata, and using the metadata to modify the header of the first packet to specify the original source address, source port, destination address, and destination port. Router 110I forwards the recovered first packet to client device 100B. The use of session-based routing may therefore form a series of way-points (e.g., routers 110) interconnected by path "segments" (e.g., end-to-end route vectors between each waypoint) that provide inline payload key exchange.

Router 110A may determine when to update the payload key. For example, router 110A may update the payload key on a periodic basis, e.g., every 5 minutes, every 30 minutes, or some other amount of time. In these examples, router 110A may update the payload key and distribute the updated payload key using the techniques described above.

Additional information with respect to session-based routing and SVR is described in U.S. Pat. No. 9,729,439, entitled "COMPUTER NETWORK PACKET FLOW CONTROLLER," and issued on Aug. 8, 2017, the entire contents of which is incorporated by reference herein.

Figure 2:
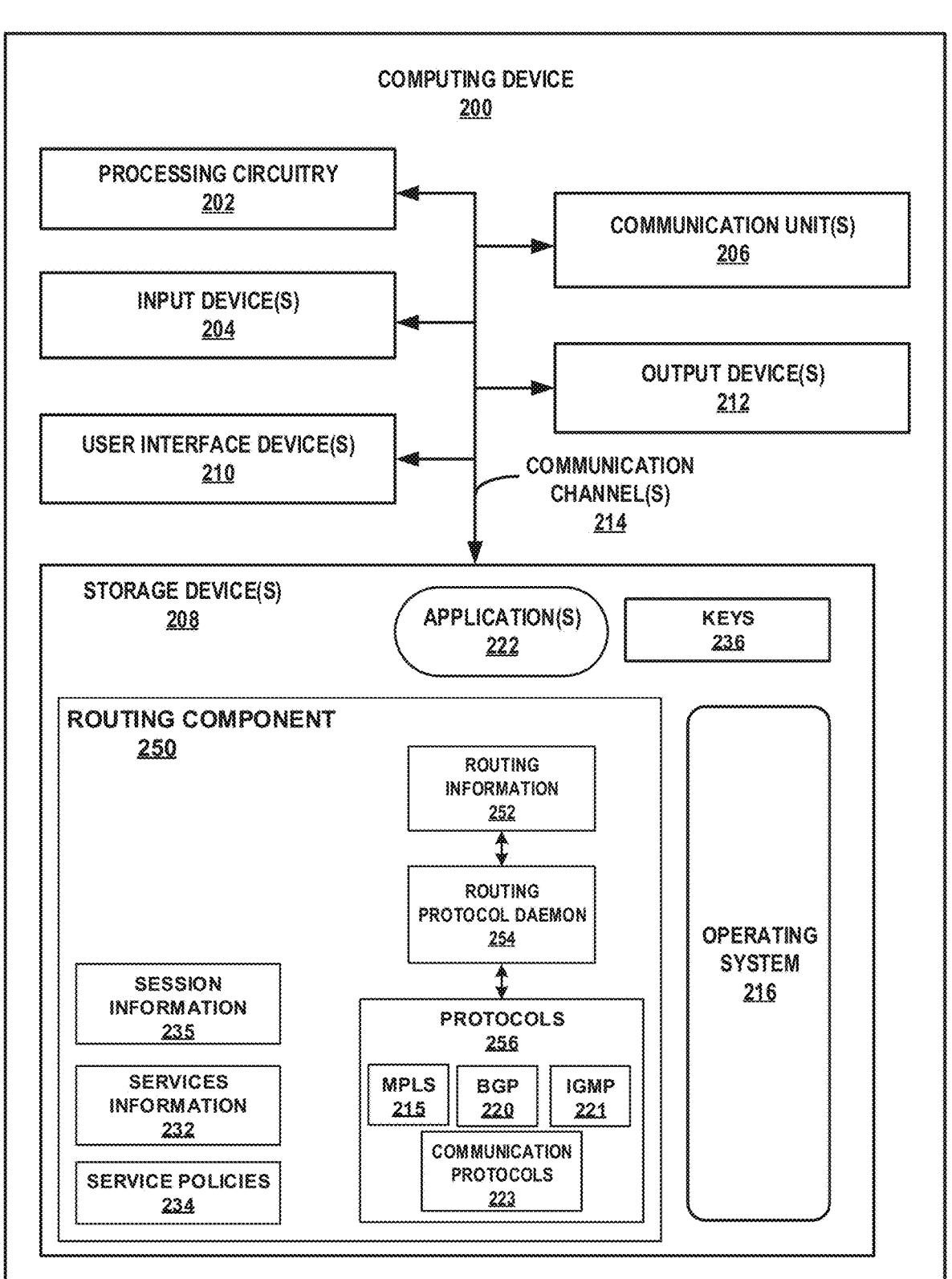
FIG. 2 is a block diagram illustrating an example router in accordance with the techniques of the disclosure.

FIG. 2 is a block diagram illustrating an example computing device 200 in accordance with the techniques of the disclosure. In general, computing device 200 may be an example implementation of one of routers 110 of FIG. 1. FIG. 2 illustrates a particular example of a server or other computing device 200 that includes processing circuitry 202 for executing any one or more of applications 222, routing component 250, or any other computing device described herein. Other examples of computing device 200 may be used in other instances.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., VirtIO and SRIOV network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input device(s) 204, one or more communication unit(s) 206, one or more output device(s) 212, one or more storage device(s) 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channel(s) 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, is configured to implement functionality and/or process instructions for execution within computing device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage device(s) 208 may be configured to store information within computing device 200 during operation. Storage device(s) 208, in some examples, is described as a computer-readable storage medium. In some examples, storage device(s) 208 include a temporary memory, meaning that a primary purpose of storage device 208 is not long-term storage. Storage device(s) 208, in some examples, include a volatile memory, meaning that storage device(s) 208 does not maintain stored contents when the computer is turned off. Examples of volatile memories include random access memories (RAM), dynamic random access memories (DRAM), static random access memories (SRAM), and other forms of volatile memories. In some examples, storage device(s) 208 stores program instructions for execution by processing circuitry 202. Storage device(s) 208, in one example, are used by software or applications running on computing device 200 to temporarily store information during program execution.

Storage device(s) 208, in some examples, also include one or more computer-readable storage media. Storage device(s) 208 may be configured to store larger amounts of information than volatile memory. Storage device(s) 208 may further be configured for long-term storage of information. In some examples, storage device(s) 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication unit(s) 206. Computing device 200, in one example, utilizes communication unit(s) 206 to communicate with external devices via one or more networks, such as one or more wired/wireless/mobile networks. Communication unit(s) 206 may include a network interface, such as an Ethernet card, an optical transceiver, a radio frequency transceiver, or any other type of device that can send and receive information. Other examples of such network interfaces may include 3G and WiFi radios. In some examples, communication unit(s) 206 may include a plurality of high-speed network interface cards. In some examples, computing device 200 uses communication unit(s) 206 to communicate with an external device. For example, computing device 200 uses communication unit(s) 206 to communicate with other routers 110 and/or client devices 100 of FIG. 1 via links 16 of FIG. 1 with which communication unit(s) 206 are connected.

Computing device 200, in one example, also includes one or more user interface device(s) 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing device 200.

One or more output device(s) 212 may also be included in computing device 200. Output device(s) 212, in some examples, is configured to provide output to a user using tactile, audio, or video stimuli. Output device(s) 212, in one example, includes a presence-sensitive display, a sound card, a video graphics adapter card, or any other type of device for converting a signal into an appropriate form understandable to humans or machines. Additional examples of output device(s) 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit(s) 206, storage device(s) 208, input device(s) 204, user interface device(s) 210, and output device(s) 212. Applications 222 may also include program instructions and/or data that are executable by computing device 200.

In some examples, processing circuitry 202 executes routing component 250, which determines routes of received packets and forwards the packets accordingly. Routing component 250 may communicate with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 may execute software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol

215, and other routing protocols. Protocols 256 may further include one or more communication session protocols, such as TCP, UDP, TLS, or ICMP.

Routing information 252 may describe a topology of the computer network in which computing device 200 resides, and may also include routes through the shared trees in the computer network. Routing information 252 may describe various routes within the computer network, and the appropriate next hops for each route, e.g., the neighboring routing devices along each of the routes. Routing information 252 may be programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

In accordance with the techniques of the disclosure, computing device 200 performs inline payload key distribution. Computing device 200 may operate as any of routers 110 of FIG. 1. With reference to FIG. 2, in the following example, computing device 200 operates as router 110A. Computing device 200 receives, via communication unit(s) 206, a packet from client device 100A destined for client device 100B. In response to receiving the packet, computing device 200 generates an L3 packet comprising an L3 header, a first portion of metadata comprising a source IP address and a source port of client device 100A and a destination IP address and a destination port of client device 100B. In some examples, computing device 200 generates the first portion of metadata specifying the session identifier and a second portion of the metadata comprising a payload key.

In some examples, the first portion of metadata comprises a session identifier. The session identifier is a unique identifier for a session comprising a first packet flow originating from a first client device (e.g., client device 100A) and destined for a second client device (e.g., client device 100B) and a second packet flow originating from the second client device and destined for the first client device. Typically, the session identifier comprises a 5-tuple, e.g., the source IP address and the source port of the first client device, the destination IP address and the destination port of the second client device, and a network protocol used by the session.

In some examples, a second portion of the metadata comprises a payload key. In some examples, computing device 200 may generate the payload key. In other examples, computing device 200 may receive the payload key from another network device, such as a security server.

In this example, the packet is a first packet of a plurality of packets for the session. In response to receiving the first packet, computing device 200 may generate a session identifier for the session between client device 100A and client device 100B and store the session identifier in session information 235 (e.g., so as to store the first portion of metadata of the L3 packet). Computing device 200 may generate, based on the first packet, the L3 packet comprising the L3 header, first portion of metadata, and the second portion of metadata, as described above. Computing device 200 may use a path key associated with the path between router 110A and router 110B to encrypt the metadata. Computing device 200 may also encrypt the payload of the packet with the payload key and then forward, via communication unit(s) 206, the L3 packet toward the next-hop router, router 110B.

For subsequent packets, computing device 200 may determine, based on information of the subsequent packets (e.g., 5-tuple), that the subsequent packets belong to the same session as the first packet. For example, in response to receiving a second packet for the session, computing device 200 may perform a lookup of session information 235 and determine, based on the source address, source port, destination address, destination port, and/or protocol specified by the second packet, that the second packet belongs to a session having a corresponding entry within session information 235.

In response to determining that the subsequent packets belong to the same session as the first packet, computing device 200 may generate, for the subsequent packets, subsequent L3 packets that include the L3 header but do not include the first portion of metadata or the second portion of the metadata (as the payload key may be associated with a given session and router 110I (FIG. 1) may already possess the payload key from decrypting the header associated with the first packet.

In some examples, when the ingress router, e.g., computing device 200 acting as router 110A, updates the payload key (e.g., by generating a new payload key), router 110A may include the second portion of metadata including the new payload key in the packet and encrypt the second portion of metadata using the path key router 110A shares with router 110B.

Computing device 200 may forward the subsequent L3 packets toward the same next-hop router 110B. Intervening network devices (e.g., routers 110B-110H) may receive the subsequent L3 packets and identify, from the L3 header of the subsequent L3 packets, the session associated with the subsequent L3 packets, and use the stored first portion of metadata to perform session-based routing of the subsequent L3 packets. In this fashion, computing device 200 may only modify the first L3 packet of the plurality of L3 packets generated for the session to include the first portion of metadata, and the second portion of metadata (unless router 110A is updating the payload key), thereby avoiding including the first and second portions of metadata within every packet of the plurality of L3 packets generated for the session while still ensuring that each L3 packet of the plurality of L3 packets is forwarded along the same path (e.g., to the same next-hop router 110) and that the original packet may be recovered from the L3 packet and decrypted by an egress router, such as router 110I.

With reference to FIG. 2, in the following example, computing device 200 operates as router 110I and receives an L3 packet modified as described above from router 110H. For example, computing device 200 receives, via communication unit(s) 206, the L3 packet comprising the L3 header, first portion of metadata, and second portion of metadata. Computing device 200 uses a path key associated with the path between router 110H and router 110I to decrypt the metadata. Computing device 200 then obtains the payload key from the second portion of the metadata. Computing device 200 may store the payload key in keys 236 or in session information 235, in the case where the payload key is associated with a session.

If the L3 packet is a first L3 packet of a plurality of L3 packets for the session, computing device 200 may use the first portion of metadata to generate a session identifier for the session between client device 100A and client device 100B and store the session identifier in session information 235 (e.g., so as to store the first portion of metadata of the L3 packet). In response to determining the packet is destined for a client device coupled to router 110I, computing device 200 may use the first portion of metadata of the L3 packet to recover the original packet. For example, computing device 200 may use the first portion of metadata to modify the header of the packet to specify the original source address, source port, destination address, and destination port. Computing device 200 may also use the payload key to decrypt the payload. Computing device 200 then forwards the recovered packet to client device 100B.

Computing device 200 may further receive subsequent L3 packets of the plurality of L3 packets that do not include the first portion of metadata or the second portion of metadata. For these subsequent L3 packets, computing device 200 may retrieve the path key associated with the path between router 110I and router 110H from keys 236 (or session information 235) and decrypt the L3 header and metadata. Computing device 200 may determine, based on the decrypted L3 header (e.g., the source IP address and source port of a previous-hop router and the destination IP address and destination port of router 110I), the subsequent L3 packets belong to the same session as the first L3 packet. Computing device 200 may retrieve from keys 236, or from session information 235, the payload key and decrypt the payload. Computing device 200 may determine the original destination port and destination address of the packet from the stored first portion of metadata for the first L3 packet. Computing device 200 may forward, via communication unit(s) 206, the subsequent packets to client device 100A. In this fashion, computing device 200 may receive only a first L3 packet that specifies the first portion of metadata and a second portion of metadata, while subsequent L3 packets do not include such information. Thereby, routers 110 as described herein may avoid including the first and second portions of metadata within every packet of the plurality of L3 packets generated for the session while still ensuring that each L3 packet of the plurality of L3 packets is forwarded along the same path (e.g., to the same next-hop router 110) and that the appropriate routers may have the correct payload key.

Figure 3:
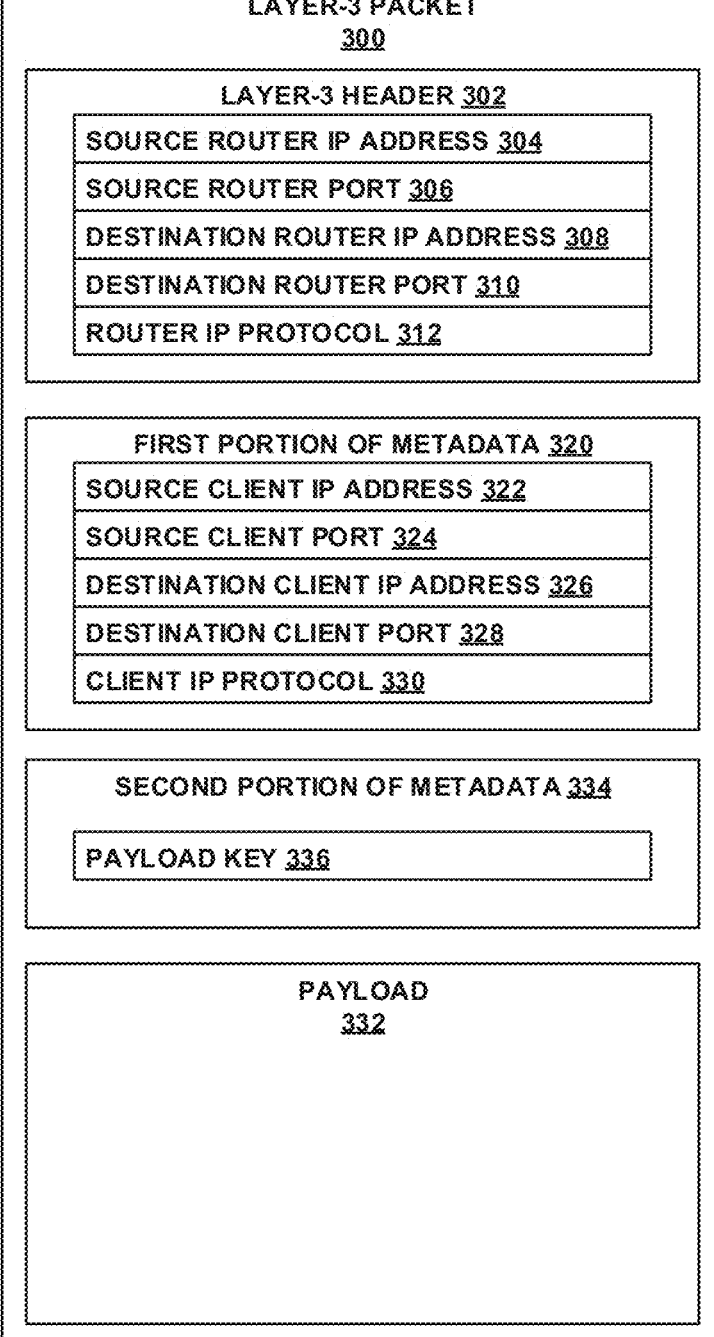
FIG. 3 is a block diagram illustrating an example data structure for an L3 packet in accordance with the techniques of the disclosure.

FIG. 3 is a block diagram illustrating an example data structure for an L3 packet in accordance with the techniques of the disclosure. L3 packet 300 includes L3 header 302, a first portion of metadata 320, a second portion of metadata 334, and data payload 332. While the example of FIG. 3 describes first portion of metadata 320 and second portions of metadata 334 in a modified packet, in some examples, the metadata includes second portion of metadata 334 (e.g., payload key 336) but not first portion of metadata 320, such as when a router is updating the payload key.

L3 header 302 specifies source router IP address 304 indicative of a device originating L3 packet 300, source port 306 indicative of a port of the originating device from which L3 packet 300 egresses, destination router IP address 308 indicative of a device to which L3 packet 300 is destined, destination port 310 indicative of a port of destination device to which L3 packet 300 is destined, and router IP protocol 312, which specifies a protocol used by L3 packet 300. In some examples, router IP protocol 312 specifies one of TCP or UDP.

First portion of metadata 320 specifies source client IP address 322, source client port 324, destination client IP address 326, destination client port 328, and client IP protocol 330. Source client IP address 322 and source client port 324 together comprise L3 address information corresponding to source MAC address of client device 100A. Destination client IP address 326 and destination client port 328 together comprise L3 address information corresponding to the MAC address of the client device 100B. Client IP protocol 330 specifies a protocol used by source client IP address 322, source client port 324, destination client IP address 326, and destination client port 328. In some examples, client IP protocol 330 specifies one of TCP or UDP.

Second portion of metadata 334 includes payload key 336 which may be used by router 110A to encrypt payload 332 and by router 110I to decrypt payload 332. Intervening network devices (e.g., routers 110B-110H) do not need to use payload key 336, as payload 332 is not intended for a client coupled to any of intervening network devices. Rather the intervening network devices (e.g., routers 110B-110H) may decrypt first portion of metadata 320, and/or second portion of metadata 334, using a path key shared by the upstream next hop router that forwarded the L3 packet 300 to the router. For example, router 110A may forward L3 packet 300 to an intervening network device (e.g., router 110B) which may use a path key shared between router 110A and 110B. Intervening network devices (e.g., routers 110B-110H) may determine that L3 packet 300 is not intended for a client device coupled to the intervening network devices based on the metadata as described herein. The intervening network devices (e.g., routers 110B-110H) may re-encrypt first portion of metadata 320, and/or second portion of metadata 334 using a path key shared with a next hop neighboring network device. The intervening network devices (e.g., routers 110B-110H) may then forward L3 packet 300 to the neighboring next hop network device. For example, router 110B may forward the packet to router 110C.

As described above with reference to FIG. 1, source router IP address 304 and source port 306 specify an IP address of router 110A and port used by router 110A to forward L3 packet 300, respectively. Destination router IP address 308 and destination port 310 specify an IP address and port of router 110B to which L3 packet 300 is destined, respectively.

Additionally, source client IP address 322 and source client port 324 of first portion of metadata 320 specify L3 address information corresponding to the MAC address of client device 100A. Destination client IP address 326 and destination client port 328 of first portion of metadata 320 specify L3 address information corresponding to the MAC address of client device 100B. As described above, routers 110 of FIG. 1 may use first portion of metadata 320 as a session identifier to identify a session associated with L3 packet 300 so as to perform session-based routing of L3 packet 300.

FIG. 4 is a flow diagram illustrating an example operation in accordance with the techniques of the disclosure. FIG. 4 is described with respect to FIG. 1 for convenience. Router 110A (FIG. 1) may obtain a first payload key (400). For example, router 110A may generate the first payload key or receive the first payload key from another network device, such as a security server. Router 110A may obtain a first path key (402), the first path key being associated with one or more paths between the ingress network device (e.g., router 110A) and a first intervening network device (e.g., router 110B) of one or more intervening network devices (e.g., routers 110B-110H). For example, router 110A may exchange path keys with router 110B to obtain the first path key.

Router 110A may encrypt a first payload of a first packet using the first payload key (404). Router 110A may insert the first payload key into first metadata of the first packet (406). For example, router 110A may insert payload key 336 into second portion of metadata 334 (both of FIG. 3). Router 110A may encrypt the first metadata using the first path key (408). For example, router 110A may use the first path key associated with one or more paths between router 110A and router 110B to encrypt the first metadata. Router 110A may send the first packet to the first intervening network device of the one or more intervening network devices (e.g., routers 110B-110H) (410), wherein the first packet is destined for an egress network device (e.g., router 110I).

In some examples, router 110I may obtain a second path key, the second path key being associated with one or more paths between the egress network device (e.g., router 110I) and a last intervening network device (e.g., router 110H) of the one or more intervening network devices (e.g., routers 110B-110H). In some examples, router 110I may receive the first packet from the last intervening network device of the one more intervening network devices (e.g., from router 110H). In some examples, router 110I may decrypt the first metadata of the first packet using the second path key. In some examples, router 110I may obtain the first payload key from the first metadata of the first packet. In some examples, router 110I may decrypt the first payload of the first packet using the first payload key.

In some examples, one or more intervening network devices (e.g., routers 110B-110H) may receive the first packet from the ingress network device (e.g., router 110A). In some examples, the one or more intervening network devices may decrypt the first metadata associated with the first packet using the first path key. For example, router 110B may decrypt the first metadata associated with the first packet using the first path key. In some examples, one or more of intervening network devices may determine that the first packet is not destined for a client device coupled to the one or more intervening network devices. In some examples, the one or more intervening network devices may encrypt the first metadata associated with the first packet using the second path key. For example, router 110H may encrypt the first metadata associated with the first packet using the second path key. In some examples, the one or more intervening network devices may send the first packet to the egress network device (e.g., router 110I).

In some examples, router 110A may encrypt a second payload of a second packet using the first payload key and send the second packet to the one or more intervening network devices (e.g., routers 110B-110H). In some examples, router 110I may receive the second packet from the one or more intervening network devices and decrypt the second payload of the second packet using the first payload key.

In some examples, router 110A may determine to update the first payload key. In some examples, router 110A may obtain a second payload key. For example, router 110A may generate the second payload key or receive the second payload key from another network device, such as a security server. In some examples, router 110A may encrypt a second payload of a second packet using the second payload key. In some examples, router 110A may insert the second payload key into second metadata of the second packet. In some examples, router 110A may encrypt the second metadata using the first path key. In some examples, router 110A may send the second packet to the one or more intervening network devices (e.g., routers 110B-110H).

In some examples, router 110I may receive the second packet from the one or more intervening network devices (e.g., routers 110B-110H). In some examples, router 110I may decrypt the second metadata of the second packet using the second path key. In some examples, router 110I may obtain the second payload key from the second metadata of the second packet. In some examples, router 110I may decrypt the second payload of the second packet using the second payload key.

In some examples, router 110A may obtain a first payload key and obtain a path key. In some examples, router 110A may encrypt a first payload of a first packet using the first payload key and insert the first payload key into first metadata of the first packet. In some examples, router 110A may encrypt the first metadata using the path key and send the first packet to another network device (e.g., router 110B).

In some examples, router 110A may obtain the first payload key by generating the first payload key or by receiving the first payload key. In some examples, router 110A may encrypt a second payload of a second packet using the first payload key and send the second packet to the another network device (e.g., router 110B).

In some examples, router 110A may determine to update the first payload key. In some examples, router 110A may obtain a second payload key. In some examples, router 110A may encrypt a second payload of a second packet using the second payload key and insert the second payload key into second metadata of the second packet. In some examples, router 110A may encrypt the second metadata using the path key and send the second packet to the another network device (e.g., router 110B). In some examples, router 110A is a session-based router.

In some examples, the first payload key is associated with a first session. In some examples, router 110A may obtain a second payload key associated with a second session. In some examples, router 110A may encrypt a second payload of a second packet associated with the second session using the second payload key and insert the second payload key into second metadata of the second packet. In some examples, router 110A may encrypt the second metadata using the path key and send the second packet to the another network device.

In some examples, the first payload key is associated with a first type of service. In some examples, router 110A obtain a second payload key associated with a second type of service. In some examples, router 110A may encrypt a second payload of a second packet associated with the second type of service using the second payload key and insert the second payload key into second metadata of the second packet. In some examples, router 110A may encrypt the second metadata using the path key and send the second packet to the another network device.

In some examples, router 110I may obtain a path key. In some examples, router 110I may receive a first packet from another network device (e.g., router 110H). In some examples, router 110I may decrypt first metadata of the first packet using the path key. In some examples, router 110I may obtain a first payload key from the first metadata of the first packet and decrypt a first payload of the first packet using the first payload key.

In some examples, router 110I may receive a second packet from the another network device and decrypt a second payload of the second packet using the first payload key.

In some examples, router 110I may receive a second packet from the another network device and decrypt second metadata of the second packet using the path key. In some examples, router 110I may obtain a second payload key from the second metadata of the second packet and decrypt a second payload of the second packet using the second payload key. In some examples, router 110I is a session-based router.

In some examples, the first payload key is associated with a first session. In some examples, router 110I may receive a second packet from the another network device (e.g., router 110H), the second packet being associated with a second session. In some examples, router 110I may decrypt second metadata of the second packet using the path key. In some examples, router 110I may obtain a second payload key from the second metadata of the second packet, the second payload key being associated with the second session, and decrypt a second payload of the second packet using the second payload key.

In some examples, the first payload key is associated with a first type of service. In some examples, router 110I may receive a second packet from the another network device (e.g., router 110H), the second packet being associated with a second type of service. In some examples, router 110I may decrypt second metadata of the second packet using the path key. In some examples, router 110I may obtain a second payload key from the second metadata of the second packet, the second payload key being associated with the second type of service, and decrypt a second payload of the second packet using the second payload key.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. Non-transitory computer readable storage media storing instructions, which, when executed cause one or more processors of a network device to:
  obtain a first payload key, the first payload key being associated with a first session;
  obtain a path key, wherein the path key is associated with a path between the network device and a neighboring network device;
  encrypt a first packet payload of a first packet using the first payload key;
  insert the first payload key into first metadata for the first packet;
  encrypt the first metadata using the path key, the first metadata including the first payload key, to generate encrypted first metadata;
  send the first packet including the encrypted first metadata and the first packet payload to the neighboring network device;
  determine that a second packet payload of a second packet is associated with the first session;

based on the second packet payload being associated with the first session, encrypt the second packet payload using the first payload key; and
  send the second packet including second metadata to the neighboring network device, the second metadata not including the first payload key.

2. The non-transitory computer readable storage media of claim 1, wherein the instructions cause the one or more processors to obtain the first payload key by generating the first payload key or by receiving the first payload key.

3. The non-transitory computer readable storage media of claim 1, wherein the instructions further cause the one or more processors to:
  determine to update the first payload key;
  obtain a second payload key;
  encrypt a third packet payload of a third packet using the second payload key;
  insert the second payload key into third metadata of the third packet;
  encrypt the third metadata using the path key; and
  send the third packet to the neighboring network device.

4. The non-transitory computer readable storage media of claim 1, wherein the instructions further cause the one or more processors to:
  obtain a second payload key associated with a second session;
  encrypt a third packet payload of a third packet associated with the second session using the second payload key;
  insert the second payload key into third metadata of the third packet;
  encrypt the third metadata using the path key; and
  send the third packet to the neighboring network device.

5. The non-transitory computer readable storage media of claim 1, wherein the first payload key is further associated with a first type of service and wherein the instructions further cause the one or more processors to:
  obtain a second payload key associated with a second type of service;
  encrypt a third packet payload of a third packet associated with the second type of service using the second payload key;
  insert the second payload key into third metadata of the third packet;
  encrypt the third metadata using the path key; and
  send the third packet to the neighboring network device.

6. The non-transitory computer readable storage media of claim 1, wherein the network device comprises a session-based router.

7. The non-transitory computer readable storage media of claim 1, wherein the neighboring network device comprises a session-based router.

8. Non-transitory computer readable storage media storing instructions, which, when executed cause one or more processors of a network device to:
  obtain a path key;
  receive a first packet from a neighboring network device;
  decrypt first metadata of the first packet using the path key;
  obtain a first payload key from the first metadata of the first packet, the first payload key being associated with a first session;
  decrypt a first packet payload of the first packet using the first payload key;
  receive a second packet including a second packet payload and second metadata from the neighboring network device, the second metadata not including the first payload key;

determine that the second packet payload is associated with the first session based on the second metadata; and decrypt the second packet payload of the second packet using the first payload key.

9. The non-transitory computer readable storage media of claim 8, wherein the instructions further cause the one or more processors to:

receive a third packet from the neighboring network device;

decrypt third metadata of the third packet using the path key;

obtain a second payload key from the third metadata of the third packet; and decrypt a third packet payload of the third packet using the second payload key.

10. The non-transitory computer readable storage media of claim 8, wherein the instructions further cause the one or more processors to:

receive a third packet from the neighboring network device, the third packet being associated with a second session;

decrypt third metadata of the third packet using the path key;

obtain a second payload key from the third metadata of the third packet, the second payload key being associated with the second session; and decrypt a third packet payload of the third packet using the second payload key.

11. The non-transitory computer readable storage media of claim 8, wherein the first payload key is further associated with a first type of service and wherein the instructions further cause the one or more processors to:

receive a third packet from the neighboring network device, the third packet being associated with a second type of service;

decrypt third metadata of the third packet using the path key;

obtain a second payload key from the third metadata of the third packet, the second payload key being associated with the second type of service; and decrypt a third packet payload of the third packet using the second payload key.

12. The non-transitory computer readable storage media of claim 8, wherein the network device comprises a session-based router.

13. The non-transitory computer readable storage media of claim 8, wherein the neighboring network device comprises a session-based router.

14. A method comprising:

obtaining, by one or more processors of an egress network device, a path key;

receiving, by the one or more processors of the egress network device, a first packet from a neighboring network device;

decrypting, by the one or more processors of the egress network device, first metadata of the first packet using the path key;

obtaining, by the one or more processors of the egress network device, a first payload key from the first metadata of the first packet, the first payload key being associated with a first session;

decrypting, by the one or more processors of the egress network device, a first packet payload of the first packet using the first payload key;

receiving, by the one or more processors of the egress network device, a second packet including a second packet payload and second metadata from the neighboring network device, the second metadata not including the first payload key;

determining, by the one or more processors of the egress network device, that the second packet payload is associated with the first session based on the second metadata; and decrypting, by the one or more processors of the egress network device, the second packet payload of the second packet using the first payload key.

15. The method of claim 14, further comprising:

receiving, by the one or more processors of the egress network device, a third packet from the neighboring network device;

decrypting, by the one or more processors of the egress network device, third metadata of the third packet using the path key;

obtaining, by the one or more processors of the egress network device, a second payload key from the third metadata of the third packet; and decrypting, by the one or more processors of the egress network device, a third packet payload of the third packet using the second payload key.

16. The method of claim 14, further comprising:

receiving, by the one or more processors of the egress network device, a third packet from the neighboring network device, the third packet being associated with a second session;

decrypting, by the one or more processors of the egress network device, third metadata of the third packet using the path key;

obtaining, by the one or more processors of the egress network device, a second payload key from the third metadata of the third packet, the second payload key being associated with the second session; and decrypting, by the one or more processors of the egress network device, a third packet payload of the third packet using the second payload key.

17. The method of claim 14, wherein the first payload key is further associated with a first type of service and wherein the method further comprises:

receiving, by the one or more processors of the egress network device, a third packet from the neighboring network device, the third packet being associated with a second type of service;

decrypting, by the one or more processors of the egress network device, third metadata of the third packet using the path key;

obtaining, by the one or more processors of the egress network device, a second payload key from the third metadata of the third packet, the second payload key being associated with the second type of service; and decrypting, by the one or more processors of the egress network device, a third packet payload of the third packet using the second payload key.

18. The method of claim 14, wherein the egress network device comprises a session-based router.

19. The method of claim 14, wherein the neighboring network device comprises a session-based router.

* * * * *